United States Patent
Alison et al.

(10) Patent No.: US 10,530,759 B2
(45) Date of Patent: *Jan. 7, 2020

(54) PROXY BYPASS LOGIN FOR APPLICATIONS ON MOBILE DEVICES

(71) Applicant: Facebook, Inc., Menlo Park, CA (US)

(72) Inventors: Thomas Alison, Palo Alto, CA (US); Micha Berdichevsky, San Francisco, CA (US); Bosmat Mazal Eldar, Menlo Park, CA (US); Shashank Pandit, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 15/437,202

(22) Filed: Feb. 20, 2017

(65) Prior Publication Data

US 2017/0161487 A1 Jun. 8, 2017

Related U.S. Application Data

(63) Continuation of application No. 14/841,393, filed on Aug. 31, 2015, now Pat. No. 9,578,011, which is a continuation of application No. 13/425,189, filed on Mar. 20, 2012, now Pat. No. 9,154,568.

(51) Int. Cl.
| | |
|---|---|
| G06F 21/44 | (2013.01) |
| H04L 29/06 | (2006.01) |
| H04W 4/21 | (2018.01) |
| H04W 12/08 | (2009.01) |
| H04L 29/08 | (2006.01) |
| H04W 12/06 | (2009.01) |

(52) U.S. Cl.
CPC .............. *H04L 63/08* (2013.01); *G06F 21/44* (2013.01); *H04L 63/0281* (2013.01); *H04L 63/083* (2013.01); *H04L 63/0884* (2013.01); *H04L 63/102* (2013.01); *H04L 67/146* (2013.01); *H04L 67/28* (2013.01); *H04W 4/21* (2018.02); *H04W 12/06* (2013.01); *H04W 12/08* (2013.01); *H04L 63/0807* (2013.01); *H04L 67/306* (2013.01); *H04L 67/42* (2013.01)

(58) Field of Classification Search
CPC . G06F 21/44; G06F 9/445; G06F 8/61; H04L 29/06; H04L 29/08; H04W 12/06
See application file for complete search history.

(56) References Cited

U.S. PATENT DOCUMENTS

| | | | |
|---|---|---|---|
| 5,960,204 A * | 9/1999 | Yinger | ........................ G06F 8/61 |
| | | | 709/221 |
| 7,275,264 B2 | 9/2007 | Cuenod | |
| 7,565,325 B2 | 7/2009 | Lenard | |
| 7,631,084 B2 * | 12/2009 | Thomas | .................. H04L 29/06 |
| | | | 709/227 |
| 8,646,060 B1 | 2/2014 | Ben Ayed | |
| 8,949,978 B1 * | 2/2015 | Lin | .......................... G06F 21/51 |
| | | | 726/12 |

(Continued)

*Primary Examiner* — Abu S Sholeman
(74) *Attorney, Agent, or Firm* — Baker Botts L.L.P.

(57) ABSTRACT

In one embodiment, an intermediate server receives a request with a secure ID to authorize a software application, transmits the secure ID to a system, receives an access token from the system indicating that the software application has been authorized, evaluates the access token for validity, and transmits a response to the mobile device indicating the software application is authorized.

18 Claims, 4 Drawing Sheets

(56) References Cited

U.S. PATENT DOCUMENTS

| | | | |
|---|---|---|---|
| 9,176,720 B1* | 11/2015 | Day-Richter | G06F 8/63 |
| 2002/0161908 A1* | 10/2002 | Benitez | G06F 8/65 |
| | | | 709/231 |
| 2004/0039827 A1* | 2/2004 | Thomas | H04L 29/06 |
| | | | 709/228 |
| 2005/0038752 A1 | 2/2005 | Gaetano, Jr. | |
| 2006/0005017 A1 | 1/2006 | Black | |
| 2006/0101023 A1* | 5/2006 | Han | H04L 67/34 |
| 2006/0112213 A1 | 5/2006 | Suzuoki | |
| 2006/0206709 A1 | 9/2006 | Labrou | |
| 2006/0253529 A1 | 11/2006 | Kirkup | |
| 2007/0130463 A1* | 6/2007 | Law | G06F 21/34 |
| | | | 713/168 |
| 2008/0307035 A1 | 12/2008 | Burckart | |
| 2009/0066476 A1 | 3/2009 | Raheman | |
| 2009/0133117 A1 | 5/2009 | Bentley | |
| 2009/0199276 A1* | 8/2009 | Schneider | H04L 63/0815 |
| | | | 726/5 |
| 2009/0228357 A1* | 9/2009 | Turakhia | G06Q 30/02 |
| | | | 705/14.53 |
| 2010/0077216 A1* | 3/2010 | Kramer | H04L 9/002 |
| | | | 713/172 |
| 2010/0235782 A1 | 9/2010 | Powell | |
| 2011/0047597 A1 | 2/2011 | Mahaffey | |
| 2011/0099621 A1 | 4/2011 | Lizarraga | |
| 2012/0110317 A1 | 5/2012 | Scheer | |
| 2012/0227087 A1* | 9/2012 | Brown | G06Q 50/01 |
| | | | 726/3 |
| 2013/0007868 A1 | 1/2013 | Hoggan | |
| 2013/0054803 A1* | 2/2013 | Shepard | H04L 63/0884 |
| | | | 709/225 |
| 2013/0061289 A1 | 3/2013 | McFarland | |
| 2013/0198313 A1 | 8/2013 | Hayton | |
| 2013/0254849 A1 | 9/2013 | Alison | |
| 2014/0081951 A1 | 3/2014 | Greedspan | |
| 2015/0200948 A1* | 7/2015 | Cairns | G06F 21/44 |
| | | | 726/4 |
| 2015/0373009 A1 | 12/2015 | Alison | |
| 2016/0249220 A1 | 8/2016 | Vaswani | |

* cited by examiner

PROXY BYPASS LOGIN FOR APPLICATIONS ON MOBILE DEVICES

PRIORITY

This application is a continuation under 35 U.S.C. § 120 of U.S. patent application Ser. No. 14/841,393, filed 31 Aug. 2015, which is a continuation under 35 U.S.C. § 120 of U.S. patent application Ser. No. 13/425,189, filed 20 Mar. 2012, both of which are incorporated herein by reference.

TECHNICAL FIELD

This disclosure generally relates to social-networking systems.

BACKGROUND

A system (e.g., a social-networking website of a social-networking system), enables its users to interact with it and with each other through the system. The system may create and store a record, often referred to as a user profile, in connection with the user. The user profile may include a user's demographic information, communication channel information, and personal interests. The system may also create and store a record of a user's relationship with other users in the system (e.g., social graph), as well as provide services (e.g., wall-posts, photo-sharing, event organization, messaging, games, or advertisements) to facilitate social interaction between users in the system. The system may transmit contents and messages related to its services to a user's client device over a network. The system may generate a personalized set of content objects to display to the user, such as a newsfeed of aggregated stories of the user's first-degree connections. A user may also install software applications that access their user profile and other data from the system.

DESCRIPTION OF EXAMPLE EMBODIMENTS

Figure 1:
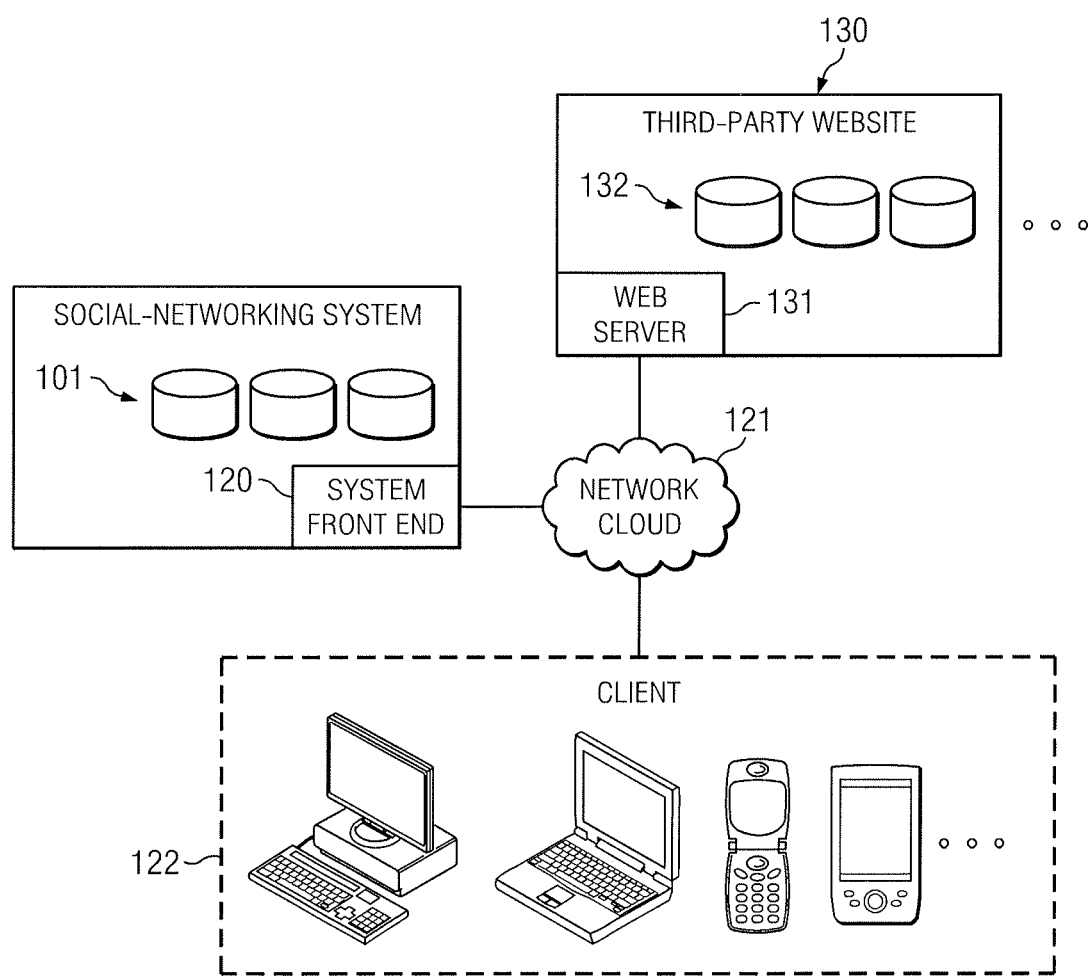
FIG. 1 illustrates an example network environment of an example social-networking system.

In particular embodiments, a social-networking system, such as a social-networking website (e.g., FACEBOOK-.COM), may enable its users to interact with it, and with each other through, the system. In order to access the social-networking system, a user may have to register, sign-up, or create an account on the social-networking system. Thereafter, the user may have to authenticate their identity to subsequently access the social-networking system. In particular embodiments, the social-networking system may use a unique identifier (ID) to authenticate a user. The unique ID may be generated by the social-networking system or created by the user. As an example and not by way of limitation, the unique ID may comprise a login ID, a password, other authentication information, or any combination thereof. As used herein, a "user" may be an individual (e.g., a human user), an entity (e.g., an enterprise, business, or third party application), or a group (e.g., of individuals or entities). Although this disclosure describes authenticating users in a particular manner, this disclosure contemplates authenticating users in any suitable manner.

In particular embodiments, a user of a social-networking system may have a user profile associated with the user. The user profile may be stored by the social-networking system. The user profile may include information provided by the user or information gathered by various systems (such as, for example, the social-networking system or a third-party website) relating to the user, or the user's activities and action. As an example and not by way of limitation, the user may provide his name, profile picture, contact information, birth date, gender, marital status, family status, employment, education background, preferences, interests, and other demographical information to be included in his user profile. The user may identify or bookmark websites or web pages he visits frequently and these websites or web pages may be included in the user's profile. The user may identify other users of the social-networking system that the user considers to be his friends. A list of the user's friends or first-degree contacts may be included in the user's profile. Although this disclosure describes particular user profiles, this disclosure contemplates any suitable user profiles.

In particular embodiments, social-networking system may maintain a social graph. A user of the social-networking system may be represented as a node in the social graph. A relationship between two users (such as, for example, a friendship, a familial relationship, etc.) may be represented as an edge connected the nodes representing the two users. The degree of separation between any two nodes is defined as the minimum number of hops required to traverse the social graph from one node to the other. In particular embodiments, the degree of separation between two users may be considered a measure of relatedness between the two users represented by the nodes in the graph. Although this disclosure describes particular types of social graphs, this disclosure contemplates any suitable types of social graphs.

In particular embodiments, a social-networking system may support a variety of applications, such as, for example, a news feed, media sharing, online calendars, event management, online communications (e.g., email, instant messaging, text, voice or video chat, wall posts, etc.), or other suitable applications. As an example and not by way of limitation, the social-networking system may allow a user to post photographs and other multimedia files to his user profile (e.g., in a wall post or in a photo album) that may be accessible to other users of the social-networking system. Although this disclosure describes a social-networking system with particular types of application, this disclosure contemplates social-networking systems with any suitable types of applications.

FIG. 1 illustrates an example network environment of an example social-networking system. In particular embodiments, a social-networking system may comprise one or more data stores 101. As an example and not by way of limitation, the social-networking system may store user-profile data and social-graph information in data stores 101. In particular embodiments, each data store 101 may comprise one or more storage devices. In particular embodiments, the social-networking system may comprise one or more computing devices (such as, for example, servers) hosting functionality directed to operation of the social-networking system. In particular embodiments, one or more of data stores 101 may be operably connected to the social-networking system's front end 120. As an example and not by way of limitation, front end 120 may be implemented in software programs hosted by one or more computing devices of the social-networking system. A user of the social-networking system may access the social-networking system using a client device 122. In particular embodiments, the system front end 120 may interact with the client device 122 through a network cloud 121. The network cloud 121 may represent a network or collection of networks (such as the Internet, a corporate intranet, a virtual private network, a local area network, a wireless local area network, a cellular network, a wide area network, a metropolitan area network, or a combination of two or more such networks) over which a client devices 122 may access the social-networking system. In particular embodiments, a client device 122 may be a computer or computing device including functionality for communicating (e.g., remotely) over a computer network. As an example and not by way of limitation, a client device 122 may be a desktop computer, laptop computer, personal digital assistant (PDA), in- or out-of-car navigation system, smart phone or other cellular or mobile phone, mobile gaming device, another suitable computing device, or two or more such computing devices. In particular embodiments, a client device 122 may execute one or more client applications, such as a web browser (e.g., MICROSOFT WINDOWS INTERNET EXPLORER, MOZILLA FIREFOX, APPLE SAFARI, GOOGLE CHROME, and OPERA, etc.) or special-purpose client application (e.g., FACEBOOK FOR IPHONE, etc.), to access and view content over a computer network. In particular embodiments, the system front end 120 may include web or HTTP server functionality, as well as other functionality, to allow users to access the social-networking system.

In particular embodiments, users of a social-networking system may access other websites or third-party websites (e.g., http://www.espn.com, http://www.youtube.com). As an example and not by way of limitation, a user may use a client device 122 to connect to and communicate with a third-party website 130 through the network cloud 121. The third-party website 130 may comprise a web server 131 operatively connected to one or more data stores 132 storing user data and webpage information. User data may include, for example, user name, user profile picture, and user profile information (e.g., location, affiliation, interest). Webpage information may include, for example, page-layout information, scripts, webpage content such as text (e.g., ASCII or HTML), media data (e.g., graphics, photos, video clips), and executable code objects (e.g., a game executable within a browser window or frame). In particular embodiments, a user may use a web browser or special-purpose client application hosted on the client device 122 to access a third-party website 130 by sending an HTTP request to a web server 131, causing the web server 131 to access the one or more data stores 132 and construct one or more webpages or frames displayed in the web browser or the special-purpose client application.

A social-networking system may communicate with and access a third-party website 130, and vice versa, through a network cloud 121. As an example and not by way of limitation, a webpage constructed by third-party website 130 for a user of a social-networking system may contain information from the social-networking system, such as a frame displaying profile pictures of the user's first-degree friends who are currently active on third-party website 130. As an example and not by way of limitation, a user's user-profile page of a social-networking system may contain an embedded video clip that the user posted on third-party website 130. In particular embodiments, a webpage constructed by a first website may include one or more inline references that cause the client device 122 to access and display content from a second website by incorporating in the webpage's HTML document Uniform in Resource Locations (URLs) and/or script code (e.g., JavaScript, PHP, AJAX) that causes a client application hosted on the client device 122 to access the second website to dynamically provide content specified by the script code (e.g., profile pictures). In particular embodiments, a browser cookie installed by a second website on client device 122 may be used to facilitate accessing the second website. As an example and not by way of limitation, requests transmitted to the social-networking system for a particular user may include a browser cookie or other token to enable authentication and access to the social-networking system for the particular user (such as, for example, to access and display profile pictures of the particular user's first-degree friends), without the particular user having to manually enter user identifier (ID) and password information of the social-networking system.

Figure 2:
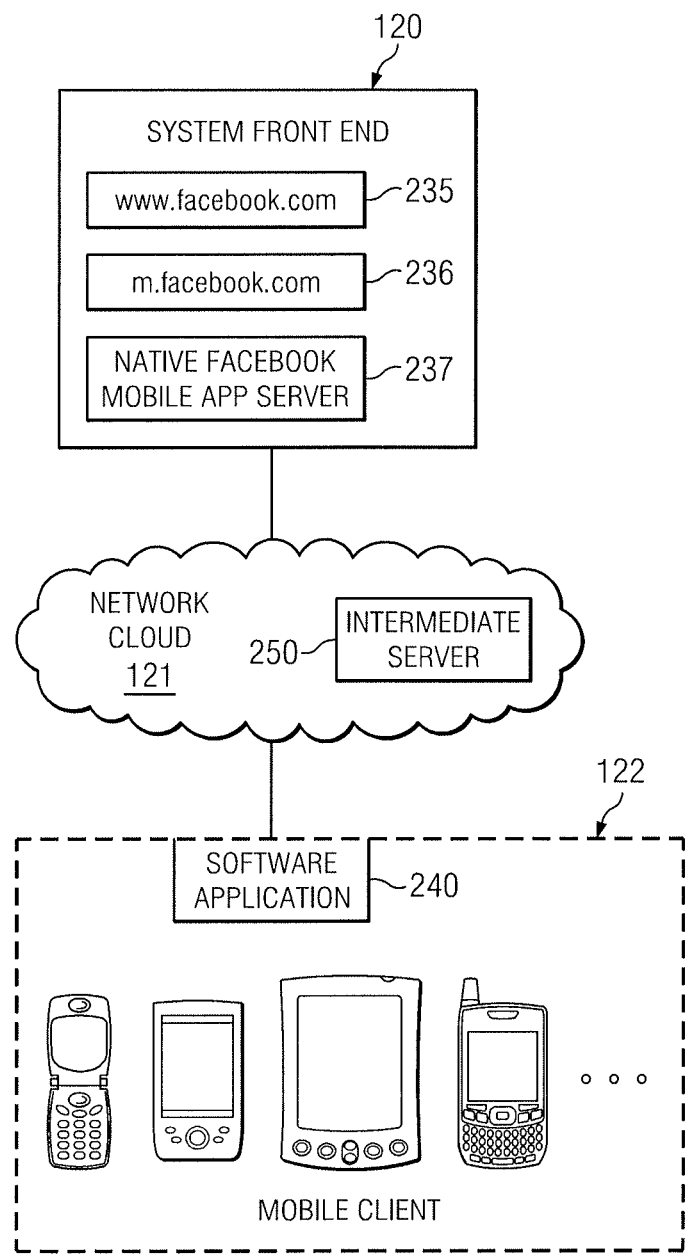
FIG. 2 illustrates an example network environment of a system front end.

FIG. 2 illustrates an example network environment of a system front end 120 of a social-networking system. The system front end 120 may facilitate accessing a social-networking system by a mobile client device 122. In particular embodiments, a user of a mobile client device 122 may choose to access the social-networking system via various channels. As an example and not by way of limitation, the mobile client device 122 may access the standard website 235 associated with the social-networking system (e.g., http://www.facebook.com) using a standard browser client. As another example and not by way of limitation, the mobile client device 122 may access the mobile version of the website 236 associated with the social-networking system (e.g., http://m.facebook.com/) using a mobile browser client (e.g., a lightweight WAP browser, such as OPERA MINI or BLACKBERRY BROWSER). As yet another example and not by way of limitation, the mobile client system 122 may access a native mobile application server 237 associated with the social-network system (e.g., a native FACEBOOK MOBILE app server) using a native software application (e.g., FACEBOOK FOR IOS, or FACEBOOK FOR ANDROID). As yet another example and not by way of limitation, the mobile client system 122 may access an intermediate server 250, which may then access one or more channels of the social-networking system on behalf of the mobile client system 122. The system front end 120 may generate views for the mobile client device 122 based the channel used to access the social-networking system. Although this disclosure describes accessing a social-networking system in a particular manner, this disclosure contemplates accessing a social-networking system in any suitable manner.

In particular embodiments, a mobile client device 122 may utilize one or more software applications 240. The software application 240 may be a native software application resident in the application memory of the mobile client device, or it may be a software application stored remotely (e.g., on a third-party server). The software application 240 may be any suitable computer program for performing any suitable activity. As an example and not by way of limitation, the software application 240 may be an application that facilitates accessing the social-networking system (e.g., FACEBOOK FOR IOS, or FACEBOOK FOR ANDROID). As another example and not by way of limitation, the software application 240 may be an application that accesses data on the social-networking system for other uses (e.g., SPOTIFY, ZYNGA POKER, etc.). In particular embodiments, a social-networking system may receive data from or transmit data to a software application 240 through a network cloud 121. A browser cookie installed on the mobile client device 122 (e.g., by the system front end 120) may be used to facilitate accessing the social-networking system. As an example and not by way of limitation, requests transmitted to the social-networking system from a user of a mobile client device 122 may include a browser cookie or other token to enable authentication and access to the social-networking system for the particular user (such as, for example, to access and display profile pictures of the particular user's first-degree friends), without the particular user having to manually enter a login ID and password information of the social-networking system. In particular embodiments, a software application 240 may receive data from or transmit data to the social-networking system through a network cloud 121. A mobile client device 122 may access a software application 240 by launching the software application from the program memory of the mobile client device 122. The software application 240 may then access the system front end 120, for example, by using an application programming interface (API) protocol. In particular embodiments, a software application 240 may receive data from or transmit data to the social-networking system via an intermediate server 250. This may be advantageous, for example, when mobile client device 122 has limited capabilities or processing power. The intermediate server 250 may communicate with the software application 240 and the social-networking system either directly or through a network cloud 121. The mobile client device 122 may access a software application 240 by launching the software application from the program memory of the mobile client device 122. The software application 240 may then access the intermediate server 250, for example, by using an application programming interface (API) protocol. The intermediate server 250 may then access the system front end 120 as a proxy for the mobile client device 122. Although this disclosure describes utilizing particular software applications in a particular manner, this disclosure contemplates utilizing any suitable software applications in any suitable manner.

In particular embodiments, a user of a social-networking system may download a software application 240 from a third-party website 130 to a mobile client device 122. As an example and not by way of limitation, the user may access a third-party online "application store," such as, for example, the IPHONE APP STORE, ANDROID MARKET, or another suitable third-party website 130, from a mobile client device 122. The user may then download the software application 240 from the third-party website 130 and install the software application 240 on the mobile client device 122. When the software application 240 is executed, the software application 240 may then access social-networking data on the social-networking system (either directly or via intermediate server 250). Social-networking data may include, for example, social graph information, user profiles, or other suitable data stored on the social-networking system. In order to access the social-networking system with the software application 240, the social-networking system may require the user to authenticate his identity, such as, for example by providing his unique ID (e.g., login ID and password). After the social-networking system has authenticated the user's identity, the software application 240 may be authorized to access the social-networking system. Although this disclosure describes downloading particular software applications in a particular manner, this disclosure contemplates downloading any suitable software applications in any suitable manner. Moreover, although this disclosure describes authorizing software applications in a particular manner, this disclosure contemplates authorizing software applications in any suitable manner.

In particular embodiments, a user of a social-networking system may download a software application 240 from the social-networking system to a mobile client device 122. As an example and not by way of limitation, the user may access an application store associated with the social-networking system, such as, for example, http://www.facebook.com/apps, or another suitable website associated with the social-networking system from a mobile client device 122. In order to access the application store associated with the social-networking system, the social-networking system may require the user to authenticate his identity, such as, for example by providing his unique ID (e.g., login ID and password). After the social-networking system has authenticated the user's identity, the user may then access the application store associated with the social-networking system to download a software application 240 from the application store to the mobile client device 122. When transmitting the software application 240, the social-networking system may also transmit a secure identifier (ID) that may be used to indicate that the user of that mobile client device 122 has been authenticated, such that the user may not have to authenticate when the user later executes the software application. When the software application 240 is executed, the software application 240 may access social-networking data on the social-networking system (either directly or via intermediate server 250). In order to access the social-networking system with the software application 240, the social-networking system may require the user to authenticate his identity, such as, for example by providing his unique ID (e.g., login ID and password). In particular embodiments, to access the social-networking system with the software application 240, the mobile client device 122 may authenticate the user by transmitting the secure ID to the social-networking system. The social-networking system may then evaluate the secure ID to determine if it is valid, and, if it is valid, may transmit an access token to the mobile client device 122, where the access token authorizes the software application 240 to access the social-networking system without the user having to provide his unique ID, thus bypassing login process. In particular embodiments, to access the social-networking system with the software application 240, the mobile client device 122 may authenticate the user by transmitting the secure ID to the intermediate server 250. The intermediate server may then pass on the secure ID to the social-network system. The social-networking system may then evaluate the secure ID to determine if it is valid, and, if it is valid, may transmit an access token to the intermediate server 250, where the access token authorizes the intermediate server 250 to access the social-networking system without the user having to provide his unique ID, thus bypassing login process. The intermediate server 250 may then access social-networking data from the social-networking system, process the social-networking data, and transmit the processed data to the software application 240. Although this disclosure describes downloading particular software applications in a particular manner, this disclosure contemplates downloading any suitable software applications in any suitable manner. Moreover, although this disclosure describes authorizing software applications in a particular manner, this disclosure contemplates authorizing software applications in any suitable manner.

In particular embodiments, a social-networking system may authenticate a user of a mobile client device 122. The user may be associated with the social-networking system. As an example and not by way of limitation, a login ID and a password to authenticate a user. As another example and not by way of limitation, the social-networking system may access a browser cookie or other token installed by the social-networking system on the mobile client device 122 that indicates that the user is authenticated. Although this disclosure describes authenticating a user in a particular manner, this disclosure contemplates authenticating a user in any suitable manner.

In particular embodiments, a social-networking system may receive a request from a mobile client device 122 to install a software application 240 on the mobile client device 122. After accessing an application store associated with the social-networking system, the user may select one or more software applications 240 that they wish to install to a mobile client device 122. This selection may be transmitted as a request to the social-networking system. As an example and not by way of limitation, a user may access http://www.facebook.com/apps using a mobile client device 122, where the user may view a webpage listing one or more software applications 240 that are available for installation. The user may then select a software application 240 to install, for example, by clicking on an icon associated with the software application 240. This may take the user to a new webpage where the software application 240 may be installed, or it may immediately install the software application 240 to the mobile client device 122. In particular embodiments, the social-networking system (or the intermediate server 250, if appropriate) may generate a session (such as, for example, an API session) in response to the first request. This session may be stored, and may be used to record the request and any data transmitted in response to the request. Although this disclosure describes receiving particular requests from a mobile client device 122, this disclosure contemplates receiving any suitable requests from a mobile client device 122.

In particular embodiments, a social-networking system may transmit data to a mobile client device 122 comprising a software application 240 and a first installation identifier (ID). The mobile client device 122 may store the software application 240 and the first secure ID, for example, in a data store on the mobile client device 122. The first secure ID may be used to indicate that the user of the mobile client device 122 has already been authenticated by the social-networking system, for example, when a software application 240 on the mobile client device 122 attempts to access the social-networking system. The first secure ID may be generated in any suitable manner, such as, for example, by using a random number generator, a hash function, a private/public key system, another suitable manner, or any combination thereof. In particular embodiments, the transmitted software application 240 may be installation files for a particular software application. The installation files may be executed to install the particular software application or to download further data for installing the particular software application on the mobile client device 122. In particular embodiments, the transmitted software application 240 may be files for accessing a computer program via the network cloud 121. That is, the software application 240 may only be a front-end application for accessing a particular computer program. In particular embodiments, the transmitted software application 240 may be data that allows the mobile client device 122 to access a web-based computer program, such as, for example, via a suitable browser client. In particular embodiments, the first secure ID may include a timestamp. As an example and not by way of limitation, the timestamp on the first secure ID may be based on the time when the social-networking received a request from the mobile client device 122 to install the software application 240. As another example and not by way of limitation, the timestamp on the first secure ID may be based on the time when first secure ID was transmitted to the mobile client device 122. In particular embodiments, the first secure ID may be encrypted. In particular embodiments, the first secure ID may be stored in a session (such as, for example, an API session), where it can be accessed later by the social-networking system or the intermediate server 250. Although this disclosure describes transmitting particular data to a mobile client device 122, this disclosure contemplates transmitting any suitable data to a mobile client device 122. Moreover, although this disclosure describes transmitting particular software applications, this disclosure contemplates transmitting any suitable software applications.

In particular embodiments, a social-networking system may receive a request from a mobile client device 122 to authorize a software application 240. The request may comprise a second secure ID, which may be based on the first secure ID that was previously transmitted with the software application 240 to the mobile device. The second secure ID may comprise information indicating that the user of the mobile client device 122 has been authenticated. As an example and not by way of limitation, when the user of the mobile client device 122 attempts to use the software application 240, the software application 240 may attempt to access the social-networking system. In order to authorize the software application 240 to access the social-networking system, the social-networking system may require the user to authenticate his identity. The mobile client device 122 may attempt to authenticate the user of the mobile client device 122 by transmitting the second secure ID, which may indicate that the user of the mobile client device 122 has already been authenticated by the social-networking system. In particular embodiments, the second secure ID may be encrypted. In particular embodiments, the mobile client device 122 may transmit the request to authorize the software application 240 and the second secure ID to an intermediate server 250. The intermediate server 250 may then transmit the request and the second secure ID to the social-networking system. The intermediate server 250 is effectively passing on the second secure ID on behalf of the mobile client device 122, facilitating authentication of the user of the mobile client device 122, as described previously. Although this disclosure describes receiving particular requests from a mobile client device 122, this disclosure contemplates receiving any suitable requests from a mobile client device 122.

In particular embodiments, a social-networking system may evaluate a second secure ID for validity. The second secure ID may be based on a first secure ID that was transmitted to the mobile client device 122 with the software application 240 when the software application 240 was installed on the mobile client device 122. This evaluation may be done in response to receiving a request from the mobile client device 122 (or from the mobile client device 122 via an intermediate server 250) to authorize a software application 240, wherein the second secure ID was received with the request. In particular embodiments, the social-networking system may evaluate the second secure ID for validity by determining whether the second secure ID is based on the first secure ID. As an example and not by way of limitation, the mobile client device 122 may have received a first secure ID that was encrypted (for example by using asymmetric key cryptography). The mobile client device 122 may have decrypted the first secure ID and stored the decrypted data on a data store on the mobile client device 122. When the user attempts to authorize the software application 240, the mobile client device 122 may access the secure ID from the data store and encrypt it to generate a second secure ID, which may be transmitted to the social-networking system. Thus, the second secure ID is based on the first secure ID in this case, however the first and second secure IDs are not necessarily identical. The social-networking system may then receive the second secure ID, decrypt it, and evaluate it for validity by confirming that it is based on the first secure ID. In particular embodiments, the social-networking system may evaluate the second secure ID for validity by determining whether the second secure ID substantially matches the first secure ID. As an example and not by way of limitation, the mobile client device 122 may have stored the first secure ID in a data store on the mobile client device 122. When the user attempts to authorize the software application 240, the mobile client device 122 may access the stored first secure ID and transmit the stored first secure ID as the second secure ID. Thus, the first and second secure IDs should be substantially identical in this case. The social-networking system may then evaluate the second secure ID received from the mobile client device 122 to confirm that it is substantially identical to the first secure ID that was previously transmitted when the software application 240 was installed on the mobile client device 122. In particular embodiments, the social-networking system may access the first secure ID from a stored session (such as, for example, an API session) and then evaluate the second secure ID for validity by determining whether the second secure ID is based on the first secure ID from the stored session. In particular embodiments, the social-networking system may evaluate the second secure ID for validity by determining whether the second secure ID has expired. As an example and not by way of limitation, the social-networking system may determine whether a timestamp included with the second secure ID is older than a threshold period of time. If the timestamp is older than the threshold period of time, then the social-networking system may indicate that the second secure ID is not valid. However, if the timestamp is not older than the threshold period of time, then the social-networking system may indicate that the second secure ID is valid. The threshold period of time may be any suitable period of time, such as, for example, 1 second, 1 minute, 1 hour, 24 hours, or another suitable period of time. Although this disclosure describes evaluating particular secure IDs for validity in a particular manner, this disclosure contemplates evaluating any suitable secure IDs for validity in any suitable manner.

In particular embodiments, a social-networking system may transmit a response to a mobile client device 122 in accordance with the evaluation of the validity of the second secure ID. If the second secure ID is evaluated as invalid, then the social-networking system may transmit a response comprising a request to the mobile client device 122 to authenticate the user of the mobile client device 122. As an example and not by way of limitation, if the second secure ID is evaluated as invalid, then the social-networking system may require the user to provide his unique ID (e.g., login ID and password) to authenticate the user. However, if the second secure ID is evaluated as valid, then the social-networking system may transmit a response comprising data authorizing the software application 240. As an example and not by way of limitation, if the second secure ID is evaluated as valid, then the social-networking system may transmit social-networking data to the mobile client device 122 for use by the software application 240. In particular embodiments, the social-networking system may transmit an access token that indicated that the software application 240 is authorized to access the social-networking system. As an example and not by way of limitation, if the second secure ID is evaluated as valid, then the social-networking system may transmit an access token to the mobile client device 122, allowing the software application 240 to access social-networking data on the social-networking system. As another example and not by way of limitation, if the second secure ID is evaluated as valid, then the social-networking system may transmit an access token to the intermediate server 250, allowing the intermediate server 250 to access social-networking data on the social-networking system, which the intermediate server 250 may then process and transmit to the mobile client device 122. In particular embodiments, the intermediate server 250 may evaluate the access token for validity. As an example and not by way of limitation, the intermediate server 250 may evaluate the access token for validity by determining whether the social-networking system evaluated the secure ID as valid. If the social-networking system has evaluated the secure ID as valid, then the intermediate server 250 may indicate that the access token is valid. As another example and not by way of limitation, the intermediate server 250 may evaluate the access token for validity by accessing the secure ID from a stored session (such as, for example, an API session) and then evaluating the access token for validity by determine whether the access token and the secure ID both correspond to the same user of the social-networking system. In particular embodiments, the intermediate server 250 may store the access token in association with information about the mobile client device 122. As an example and not by way of limitation, the access token may be stored in association with the secure ID associated with the mobile client device 122 or social-networking data associated with the user of the mobile client device 122. Although this disclosure describes transmitting particular responses to a mobile client device 122 in accordance with particular evaluations, this disclosure contemplates transmitting any suitable responses to a mobile client device 122 in accordance with any suitable evaluations.

In particular embodiments, an intermediate server 250 may receive a request from a mobile client device 122 for social-networking data from the social-networking system. The software application 240 on mobile client device 122 may only be authorized to access the social-networking system via intermediate server 250. This may be the case where the mobile client device 122 has limited capabilities or processing power. The intermediate server 250 may then access any requested social-networking data on the social-networking system and process and transmit the data as appropriate. As an example and not by way of limitation, a user of a mobile client device 122 may attempt to access a user profile from the social-networking system using a software application 240. The software application 240 may then transmit (via the mobile client device 122) a request for the user profile to the intermediate server 250. Although this disclosure describes receiving particular request for particular data, this disclosure contemplates receiving any suitable requests for any suitable data.

In particular embodiments, an intermediate server 250 may access social-networking data on a social-networking system. If the intermediate server 250 has received an access token from the social-networking system, the intermediate server 250 may then be authorized to access social-networking data on the social-networking system as a proxy for the software application 240. When the intermediate server 250 accesses the social-networking system, it may first transmit the access token associated with the requesting mobile client device 122 to the social-networking system. The social-networking system can then verify that the intermediate server 250 is authorized to access the social-networking system on behalf of a particular mobile client device 122. As an example and not by way of limitation, if the intermediate server 250 received a request for a user profile from a mobile client device 122, the intermediate server 250 may then transmit a request to the social-networking system for the user profile, and the request may comprise the access token associated with the mobile client device 122. The social-networking server may then evaluate the access token to determine whether it is valid. If the access token is valid, the social-networking system may then transmit the request user profile to the intermediate server 250. Although this disclosure describes accessing particular data from a social-networking system in a particular manner, this disclosure contemplates accessing any suitable data from a social-networking system in any suitable manner.

In particular embodiments, an intermediate server 250 may generate a display data optimized for display on the mobile client device 122. The display data is based on the social-networking data that was requested by the mobile client device 122. If the mobile client device 122 has limited capabilities or processing power, it may be desirable to optimize the requested social-networking data to that it can be presented on the mobile client device 122. In particular embodiments, the display data may comprise a rendered image capable of being displayed on the mobile device. As an example and not by way of limitation, the intermediate server 250 may access a user profile from the social-networking system, which may be objects in an API session. The intermediate server 250 may then process the objects to generate a rendered image (e.g., JPEG, TIFF) that may be displayed on the mobile client device 122. Although this disclosure describes generating particular data for display in a particular manner, this disclosure contemplates any generating any suitable data for display in any suitable manner.

In particular embodiments, an intermediate server 250 may transmit the display data to the mobile client device 122. The display data may then be displayed on the mobile client device 122. As an example and not by way of limitation, the intermediate server 250 may transmit a rendered image of a user profile from the social-networking system. This rendered image may then be displayed on display of the mobile client device 122. Thus, in order to display the requested social-networking data, the mobile client device 122 does not have to actually process any social-networking data and can instead merely display the rendered image that was generated by the intermediate server 250. Although this disclosure describes transmitting particular data in a particular manner, this disclosure contemplates transmitting any suitable data in any suitable manner.

Figure 3:
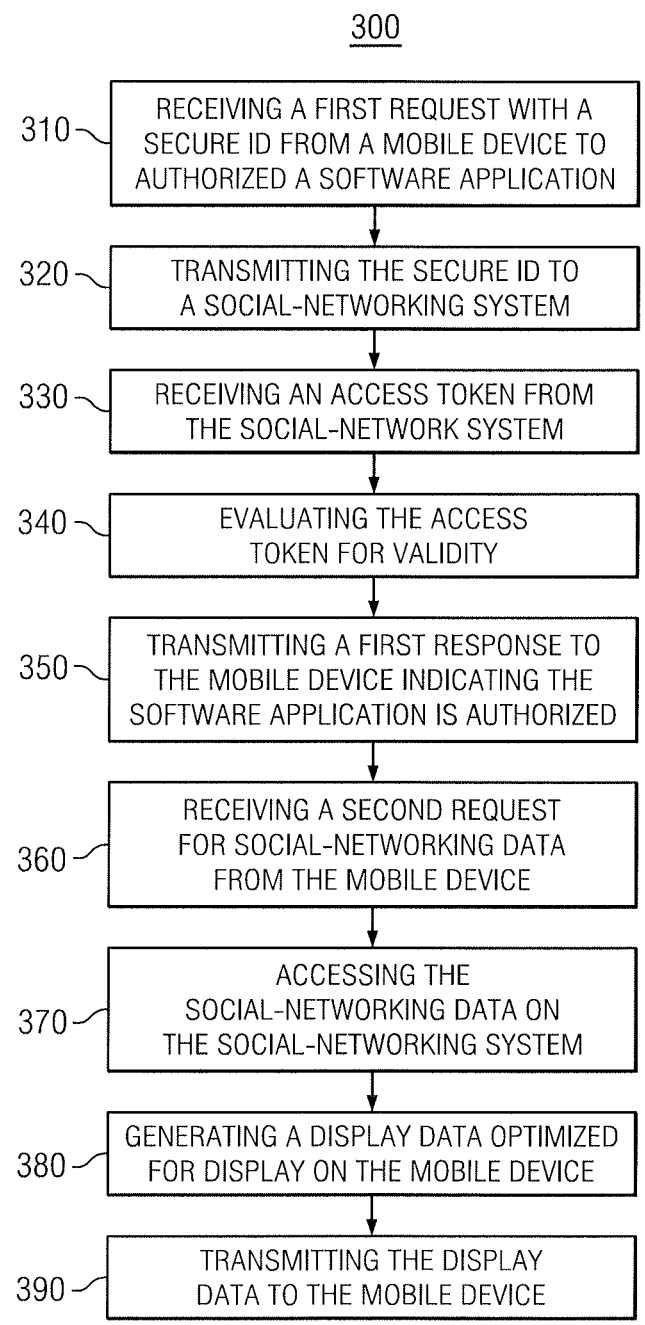
FIG. 3 illustrates an example method.

FIG. 3 illustrates an example method 300 for implementing particular embodiments. The method begins at step 310, where the intermediate server 250 may receive a first request from a mobile client device 122 to authorize a software application 240. The first request may comprise a secure ID. At step 320, the intermediate server 250 may transmit the secure ID to a social-networking system. At step 330, the intermediate server 250 may receive an access token from the social-networking system. The access token may indicate that the software application 240 has been authorized by the social-networking system. At step 340, the intermediate server 250 may evaluate the access token for validity. At step 350, the intermediate server 250 may transmit a first response to the mobile client device 122 indicating the software application 240 is authorized. At step 360, the intermediate server 250 may receive a second request for social-networking data from the mobile client device 122. At step 370, the intermediate server 250 may access the social-networking data on the social-networking system. At step 380, the intermediate server 250 may generate a display data optimized for display on the mobile client device 122. The display data may be based on the social-networking data. At step 390, the intermediate server 250 may transmit the display data to the mobile client device 122. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components carrying out particular steps of the method of FIG. 3, this disclosure contemplates any suitable combination of any suitable components carrying out any suitable steps of the method of FIG. 3.

Figure 4:
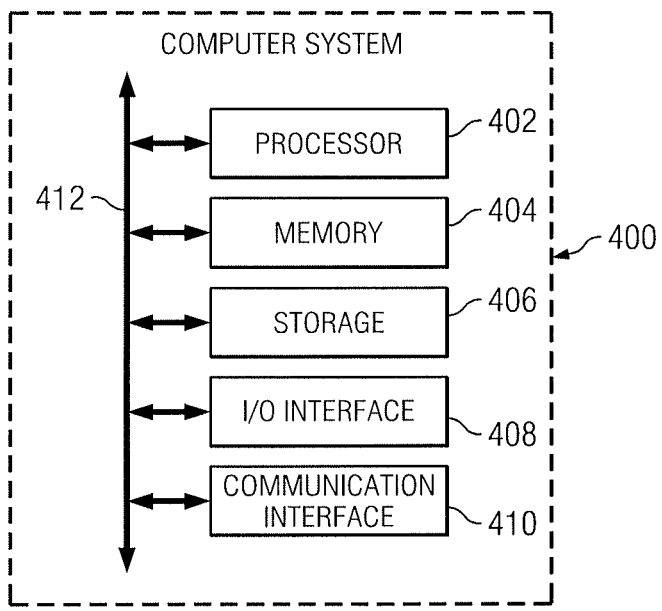
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable non-transitory storage medium may include a semiconductor-based or other integrated circuit (IC) (such as, for example, a field-programmable gate array (FPGA) or an application-specific IC (ASIC)), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 5:
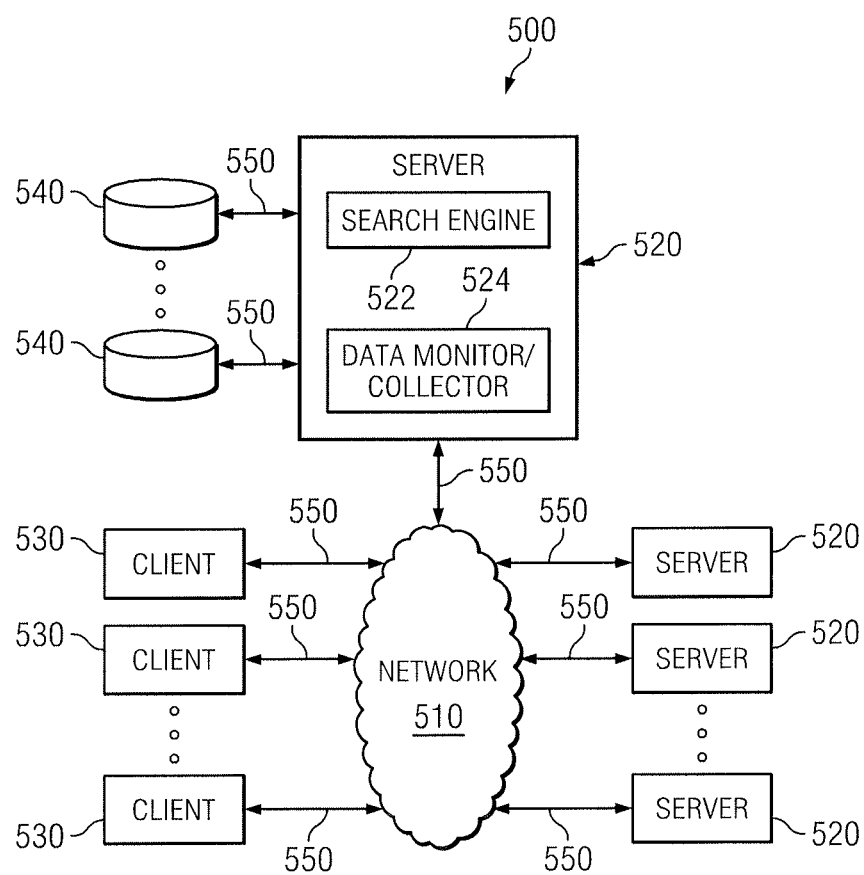
FIG. 5 illustrates an example network environment.

FIG. 5 illustrates an example network environment 500. This disclosure contemplates any suitable network environment 500. As an example and not by way of limitation, although this disclosure describes and illustrates a network environment 500 that implements a client-server model, this disclosure contemplates one or more portions of a network environment 500 being peer-to-peer, where appropriate. Particular embodiments may operate in whole or in part in one or more network environments 500. In particular embodiments, one or more elements of network environment 500 provide functionality described or illustrated herein. Particular embodiments include one or more portions of network environment 500. Network environment 500 includes a network 510 coupling one or more servers 520 and one or more clients 530 to each other. This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 couple servers 520 and clients 530 to network 510 or to each other. This disclosure contemplates any suitable links 550. As an example and not by way of limitation, one or more links 550 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 550. In particular embodiments, one or more links 550 each includes an intranet, an extranet, a VPN, a LAN, a WLAN, a WAN, a MAN, a communications network, a satellite network, a portion of the Internet, or another link 550 or a combination of two or more such links 550. Links 550 need not necessarily be the same throughout network environment 500. One or more first links 550 may differ in one or more respects from one or more second links 550.

This disclosure contemplates any suitable servers 520. As an example and not by way of limitation, one or more servers 520 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 520 includes hardware, software, or both for providing the functionality of server 520. As an example and not by way of limitation, a server 520 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 530, the web server may communicate one or more such files to client 530. As another example, a server 520 that operates as a mail server may be capable of providing e-mail services to one or more clients 530. As another example, a server 520 that operates as a database server may be capable of providing an interface for interacting with one or more data stores (such as, for example, data stores 540 described below). Where appropriate, a server 520 may include one or more servers 520; be unitary or distributed; span multiple locations; span multiple machines; span multiple datacenters; or reside in a cloud, which may include one or more cloud components in one or more networks.

In particular embodiments, one or more links 550 may couple a server 520 to one or more data stores 540. A data store 540 may store any suitable information, and the contents of a data store 540 may be organized in any suitable manner. As an example and not by way or limitation, the contents of a data store 540 may be stored as a dimensional, flat, hierarchical, network, object-oriented, relational, XML, or other suitable database or a combination or two or more of these. A data store 540 (or a server 520 coupled to it) may include a database-management system or other hardware or software for managing the contents of data store 540. The database-management system may perform read and write operations, delete or erase data, perform data deduplication, query or search the contents of data store 540, or provide other access to data store 540.

In particular embodiments, one or more servers 520 may each include one or more search engines 522. A search engine 522 may include hardware, software, or both for providing the functionality of search engine 522. As an example and not by way of limitation, a search engine 522 may implement one or more search algorithms to identify network resources in response to search queries received at search engine 522, one or more ranking algorithms to rank identified network resources, or one or more summarization algorithms to summarize identified network resources. In particular embodiments, a ranking algorithm implemented by a search engine 522 may use a machine-learned ranking formula, which the ranking algorithm may obtain automatically from a set of training data constructed from pairs of search queries and selected Uniform Resource Locators (URLs), where appropriate.

In particular embodiments, one or more servers 520 may each include one or more data monitors/collectors 524. A data monitor/collection 524 may include hardware, software, or both for providing the functionality of data collector/collector 524. As an example and not by way of limitation, a data monitor/collector 524 at a server 520 may monitor and collect network-traffic data at server 520 and store the network-traffic data in one or more data stores 540. In particular embodiments, server 520 or another device may extract pairs of search queries and selected URLs from the network-traffic data, where appropriate.

This disclosure contemplates any suitable clients 530. A client 530 may enable a user at client 530 to access or otherwise communicate with network 510, servers 520, or other clients 530. As an example and not by way of limitation, a client 530 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 530 may be an electronic device including hardware, software, or both for providing the functionality of client 530. As an example and not by way of limitation, a client 530 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 530 may include one or more clients 530; be unitary or distributed; span multiple locations; span multiple machines; span multiple datacenters; or reside in a cloud, which may include one or more cloud components in one or more networks.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Furthermore, "a", "an," or "the" is intended to mean "one or more," unless expressly indicated otherwise or indicated otherwise by context. Therefore, herein, "an A" or "the A" means "one or more A," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, this disclosure encompasses any suitable combination of one or more features from any example embodiment with one or more features of any other example embodiment herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a client system of a user:
    transmitting, from the client system to a remote system by an intermediate server, a first request to install an application of the remote system on the client system, wherein the application is operable to access content from the remote system;
    receiving, at the client system from the remote system by the intermediate server, the application and a first secure identifier responsive to the first request to install the application, wherein the first secure identifier indicates to the intermediate server that the user is authenticated to the remote system;

generating, by the client system, a second secure identifier based on the first secure identifier;

transmitting, from the client system to the remote system by the intermediate server, a second request from the client system to authorize the application to access the remote system, the second request comprising the second secure identifier; and receiving, at the client system from the remote system by the intermediate server, an access token, wherein the access token indicates that the second secure identifier is valid, and wherein the access token authorizes the application to access the remote system.

2. The method of claim 1, wherein the access token authorizes the application to access social-networking data from the remote system.

3. The method of claim 2, further comprising:

transmitting, from the client system to the remote system by the intermediate server, a third request from the client system to access the social-networking data via the remote system, the third request comprising the access token; and receiving, at the client system from the remote system by the intermediate server, the social-networking data for presentation on the client system.

4. The method of claim 3, wherein the social-networking data is configured optimized by the intermediate server for presentation on a user interface of the client system.

5. The method of claim 3, wherein the access token is stored by the intermediate server, the access token further comprising information about the client system, and wherein the access token authorizes the intermediate server to access the remote system for the social-networking data one or more times without requesting additional information from the user.

6. The method of claim 3, wherein the third request is a request for a user profile, the social-networking data including the user profile.

7. The method of claim 6, wherein the presentation of the social-networking data comprises a rendered image of the user profile configured to be displayed on the client system.

8. The method of claim 3, wherein the remote system comprises a social-networking system, the social-networking data being stored by a data store of the social-networking system.

9. The method of claim 1, wherein the access token indicates that the second secure identifier is valid via a determination of the remote system that the second secure identifier is valid.

10. The method of claim 1, wherein the second secure identifier substantially matches the first secure identifier.

11. The method of claim 10, wherein the second secure identifier comprises a timestamp, and wherein the timestamp is based on the time when social-networking data was transmitted to the client system.

12. The method of claim 1, the method further comprising:

determining, by the remote system by the intermediate server, that the timestamp is older than a threshold period of time; and receiving an indication, from the remote system by the intermediate server, that the second secure ID is not valid.

13. The method of claim 12, wherein the threshold period of time is 24 hours.

14. The method of claim 1, the method further comprising:

determining, by the remote system by the intermediate server, that the timestamp is not older than a threshold period of time; and receiving, by the remote system by the intermediate server, authorization for the application to access the system.

15. The method of claim 1, wherein the first secure identifier or second secure identifier is encrypted.

16. The method of claim 1, wherein the user is associated with a social-networking system.

17. An apparatus comprising: one or more processors; and a memory coupled to the processors comprising instructions executable by the processors, the processors operable when executing the instructions to:

transmit, from the client system to a remote system by an intermediate server, a first request to install an application of the remote system on the client system, wherein the application is operable to access content from the remote system;

receive, at the client system from the remote system by the intermediate server, the application and a first secure identifier responsive to the first request to install the application, wherein the first secure identifier indicates to the intermediate server that the user is authenticated to the remote system;

generate, by the client system, a second secure identifier based on the first secure identifier;

transmit, from the client system to the remote system by the intermediate server, a second request from the client system to authorize the application to access the remote system, the second request comprising the second secure identifier; and receive, at the client system from the remote system by the intermediate server, an access token, wherein the access token indicates that the second secure identifier is valid, and wherein the access token authorizes the application to access the remote system.

18. One or more computer-readable non-transitory storage media embodying software that is operable when executed to:

transmit, from the client system to a remote system by an intermediate server, a first request to install an application of the remote system on the client system, wherein the application is operable to access content from the remote system;

receive, at the client system from the remote system by the intermediate server, the application and a first secure identifier responsive to the first request to install the application, wherein the first secure identifier indicates to the intermediate server that the user is authenticated to the remote system;

generate, by the client system, a second secure identifier based on the first secure identifier;

transmit, from the client system to the remote system by the intermediate server, a second request from the client system to authorize the application to access the remote system, the second request comprising the second secure identifier;

receive, at the client system from the remote system by the intermediate server, an access token, wherein the access token indicates that the second secure identifier is valid, and wherein the access token authorizes the application to access the remote system.

* * * * *